(12) United States Patent
Gaddam et al.

(10) Patent No.: US 6,677,402 B2
(45) Date of Patent: Jan. 13, 2004

(54) PRESSURE SENSITIVE ADHESIVES POSSESSING HIGH LOAD BEARING CAPABILITY

(75) Inventors: Babu N. Gaddam, Woodbury, MN (US); Steven M. Heilmann, Afton, MN (US); Ahmed S. Abuelyaman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 113 days.

(21) Appl. No.: 10/081,689

(22) Filed: Feb. 20, 2002

(65) Prior Publication Data

US 2002/0132927 A1 Sep. 19, 2002

Related U.S. Application Data

(62) Division of application No. 09/413,682, filed on Oct. 7, 1999, now Pat. No. 6,448,337.

(51) Int. Cl.$^7$ .................. C09J 131/00; C09J 133/00; C09J 137/00; C09J 175/00
(52) U.S. Cl. .................. 525/185; 525/190; 525/242; 525/452; 525/539; 525/540
(58) Field of Search .................. 525/185, 190, 525/242, 452, 539, 540

(56) References Cited

U.S. PATENT DOCUMENTS

| | | |
|---|---|---|
| RE24,906 E | 12/1960 | Ulrich |
| 3,598,790 A | 8/1971 | Kollinsky et al. |
| 4,181,752 A | 1/1980 | Martens et al. |
| 4,243,500 A | 1/1981 | Glennon |
| 4,329,384 A | 5/1982 | Vesley et al. |
| 4,330,590 A | 5/1982 | Vesley |
| 4,364,972 A | 12/1982 | Moon |
| 4,379,201 A | 4/1983 | Heilmann et al. |
| 4,391,687 A | 7/1983 | Vesley |
| 4,507,466 A | 3/1985 | Tomalia et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,665,106 A | 5/1987 | Ohta et al. |
| 4,694,064 A | 9/1987 | Tomalia et al. |
| 4,713,975 A | 12/1987 | Tomalia et al. |
| 4,737,550 A | 4/1988 | Tomalia |
| 4,857,599 A | 8/1989 | Tomalia et al. |
| 4,871,779 A | 10/1989 | Killat et al. |
| 4,968,562 A | 11/1990 | Delgado |
| 5,081,197 A | 1/1992 | Heilmann et al. |
| 5,202,361 A | 4/1993 | Zimmerman et al. |
| 5,418,301 A | 5/1995 | Hult et al. |
| 5,506,279 A | 4/1996 | Babu et al. |
| 5,741,543 A | 4/1998 | Winslow et al. |
| 5,902,836 A | 5/1999 | Bennett et al. |
| 5,962,584 A | 10/1999 | Dougherty |
| 6,007,833 A | 12/1999 | Chudzik et al. |
| 6,057,034 A | 5/2000 | Yamazaki et al. |

FOREIGN PATENT DOCUMENTS

| | | |
|---|---|---|
| DE | 37 10 698 A1 | 1/1988 |
| EP | 0 874 012 A1 | 10/1998 |
| JP | 58-046236 | 10/1983 |
| JP | 63-048881 | 10/1988 |
| JP | 02-187478 | 7/1990 |
| JP | 4-025589 | 1/1992 |

OTHER PUBLICATIONS

U.S. patent application Ser. No. 09/602,978, "Fibrillated Article and Method of Making", filed Jun. 23, 2000.
U.S. patent application Ser. No. 09/858,253, "Fibrous Films and Articles From Microlayer Substrates", filed May 15, 2001.

*Primary Examiner*—Jeffrey Mullis
(74) *Attorney, Agent, or Firm*—Kent S. Kokko

(57) ABSTRACT

Pressure sensitive adhesives are provided which possess high load bearing capabilities at elevated temperatures. The adhesives are prepared by polymerization of a syrup polymer composition having a first solute polymer having reactive, pendant functional groups, a second component having co-reactive functional groups, and a monomer mixture. The syrup polymer contains reactive electrophilic or nucleophilic functional groups that can subsequently crosslink by reaction with a second component having co-reactive functional groups.

20 Claims, No Drawings

PRESSURE SENSITIVE ADHESIVES POSSESSING HIGH LOAD BEARING CAPABILITY

This application is a divisional of U.S. application Ser. No. 09/413,682, filed Oct. 7, 1999, now U.S. Pat. No. 6,448,337.

TECHNICAL FIELD OF THE INVENTION

This invention relates to pressure sensitive adhesives and tape articles prepared therefrom. The tapes are characterized by exhibiting an overall balance of adhesive and cohesive characteristics and exceptional load bearing capabilities at elevated temperatures.

BACKGROUND OF THE INVENTION

Pressure sensitive tapes are virtually ubiquitous in the home and workplace. In its simplest configuration, a pressure sensitive tape comprises an adhesive and a backing, and the overall construction is tacky at the use temperature and adheres to a variety of substrates using only moderate pressure to form the bond. In this fashion, pressure sensitive tapes constitute a complete, self-contained bonding system.

According to D. W. Aubrey in "Developments in Adhesives" (ed. W. C. Wake, Vol. 1, Chapter 5, Applied Science Publishers: London, 1977), a good pressure sensitive adhesive (psa) must fulfill three main technical requirements:

1. The adhesive must conform quickly to the surface to which it is applied in order to rapidly form a bond; this relates to tack.
2. The adhesive must display adequate resistance to separation by peeling once the bond is formed; this relates to adhesion.
3. The adhesive must exhibit resistance to shear under the influence of an applied load; this relates to the adhesive's cohesion.

These three requirements are assessed generally by means of tests which are designed to individually measure tack, adhesion (peel strength), and cohesion (shear holding power). These measurements taken together constitute the balance of properties often used to characterize a psa.

With broadened use of pressure sensitive tapes over the years, performance requirements have become more demanding. Shear holding capability, for example, which originally was intended for applications supporting modest loads at room temperature has now increased substantially for many applications in terms of operating temperature and load. So-called high performance pressure sensitive tapes are those capable of essentially permanently supporting loads of >300 grams per square centimeter of adhesive at temperatures of 150° F. (65° C.) or higher. Increased shear holding capability has generally been accomplished by crosslinking the psa, although considerable care must be exercised so that high levels of tack and adhesion are retained in order to retain the aforementioned balance of properties.

SUMMARY OF THE INVENTION

In one aspect this invention provides a novel pre-adhesive syrup polymer composition comprising:
- a first component comprising a solute polymer comprising a plurality of polymerized monomer units comprising pendant reactive nucleophilic or electrophilic functional groups;
- a second component having a plurality of co-reactive nucleophilic or electrophilic functional groups selected from a second solute polymer comprising a plurality of polymerized monomer units comprising co-reactive functional groups and a polyfunctional compound having co-reactive functional groups; and
- a third component comprising at least one free-radically polymerizable solvent monomer.

The novel pre-adhesive syrup polymer compositions of the present invention cure to pressure sensitive adhesives possessing high load bearing capability at elevated temperatures by means of the photopolymerization of the solvent monomer component and crosslinking by means of reactive and co-reactive functional groups. In another aspect the invention provides an adhesive article comprising the polymerized, crosslinked syrup polymer coated on a substrate.

In another aspect this invention provides a process of preparing a novel adhesive composition which comprises the steps of providing the novel syrup polymer composition of this invention further comprising an effective amount of a photoinitiator, and subjecting said composition to sufficient energy to activate said photoinitiator to polymerize the solvent monomer(s) of the syrup polymer composition, and crosslinking the first solute polymer and second component by forming covalent bonds between the reactive and co-reactive functional groups.

For performance, environmental, and economic considerations, photoinitiated polymerization is a particularly desirable method for preparing a psa directly on the tape backing (or release liner in the case of a so-called transfer tape in which the psa is ultimately transferred to a substrate instead of a tape backing to provide for adhesion of the bonded article or adherend). With this bulk polymerization technique, a common practice in order to achieve a coatable viscosity of 500–10,000 centipoises is to partially polymerize, either thermally or photochemically, the monomers to a conversion of 5–10%.

In another aspect this invention provides a process for preparing an adhesive article comprising coating the novel syrup polymer composition on a substrate in the presence of a free-radical initiator, and subjecting the coated substrate to sufficient energy to polymerize the solvent monomer and crosslink the components by forming covalent bonds between the reactive and co-reactive functional groups.

Briefly, the present invention provides novel pressure sensitive photoadhesive compositions prepared from a first solute polymer containing reactive functional groups capable of reaction at effective rates (at normal processing temperatures) with a co-reactive second component possessing functionality that is complementary to that of the first solute polymer. By complementary is meant that if the solute polymer reactive functional groups are electrophilic in nature, the second component should possess co-reactive nucleophilic groups. The converse is also useful; when the solute polymer contains reactive nucleophilic groups then the second component contains co-reactive electrophilic groups. In addition, reactions involving polymeric reactants of the instant invention are controlled and precise in that they result in polymer—polymer coupling reactions only by reaction between the reactive and co-reactive functional groups. The polymerization of the novel syrup polymer composition has been discovered to provide high load holding capability pressure sensitive adhesives, especially at elevated temperatures.

In this application "pre-adhesive" refers to the solution comprising functional solute polymer, a second component and third monomer component which may be polymerized and crosslinked to form a pressure sensitive adhesive.

"Syrup polymer" refers to a solution of a solute polymer in one or more solvent monomers, the solution having a viscosity of from 500 to 10,000 cPs at 22° C.

DETAILED DESCRIPTION OF THE INVENTION

The present invention provides pressure sensitive adhesives possessing essentially permanent, high load bearing capabilities at temperatures up to 70° C. The pressure sensitive adhesives of the invention are polymers exhibiting a glass transition temperature of less than −15° C. and are formed from 100 parts of ethylenically unsaturated monomers and polymers. The pressure sensitive adhesives comprise a polymerized product of a syrup polymer mixture comprising:

(a) from 2 to 20 parts by weight of a first component comprising a solute polymer having pendant reactive electrophilic or nucleophilic functional groups:

(b) from 0.01 to 10.00 parts by weight of a second component having a plurality of co-reactive electrophilic or nucleophilic functional groups;

(c) from 70.00–97.99 parts by weight of a third component comprising polymerizable, ethylenically-unsaturated monomers selected from acrylic acid esters of non-tertiary alkyl alcohols containing 1–14 carbon atoms (i.e. "acrylate monomers").

This invention also provides a polymerizable syrup polymer comprising the syrup polymer and photoinitiator.

The first solute polymer, as well as the second solute polymer (if used in lieu of the polyfunctional compound) comprises (1) from 75.00 to 99.99 parts by weight of polymerized monomer units derived from acrylic acid esters of non-tertiary alkyl alcohols containing 1–14 carbon atoms;

(2) from 0.01 to 5.00 parts by weight of a polymerized monomer units derived from an ethylenically-unsaturated monomer possessing co-reactive functional groups; (i.e. "functional monomers");

(3) from 0 to 10 parts by weight of at least one polar monomer; (i.e. "polar monomers") and (4) from 0 to 10 parts by weight of other monomers (described below).

The second component of the syrup polymer composition (b) may be a second solute polymer having co-reactive functional groups, or may be a polyfunctional compound having a plurality of co-reactive functional groups. Where a second solute polymer is used, the polymer may be prepared in situ in the syrup polymer mixture or may be separately prepared and added to the syrup polymer mixture. The pressure sensitive adhesive of the invention results from polymerization of the syrup polymer composition and crosslinking formed by reaction of the reactive and co-reactive functional groups.

Monomers that are useful and that comprise the major portion of the first and second solute polymers, and the third component solvent monomers are predominantly alkyl acrylate esters. Alkyl acrylate ester monomers useful in the invention include straight-chain, cyclic, and branched-chain isomers of alkyl esters containing $C_1$–$C_{14}$ alkyl groups. Due to $T_g$ and sidechain crystallinity considerations, preferred alkyl acrylate esters are those having from $C_5$–$C_{12}$ alkyl groups, although use of $C_1$–$C_4$ and $C_{13}$–$C_{14}$ alkyl groups are also useful if the combinations provide a molecule averaged number of carbon atoms between $C_5$ and $C_{12}$. Useful specific examples of alkyl acrylate esters include: methyl acrylate, ethyl acrylate, n-propyl acrylate, 2-butyl acrylate, iso-amyl acrylate, n-hexyl acrylate, n-heptyl acrylate, isobornyl acrylate, n-octyl acrylate, iso-octyl acrylate, 2-ethylhexyl acrylate, iso-nonyl acrylate, decyl acrylate, undecyl acrylate, dodecyl acrylate, tridecyl acrylate, and tetradecyl acrylate. Most preferred acrylate esters include iso-octyl acrylate, 2-ethylhexyl acrylate, and isobornyl acrylate.

Useful functional monomers include those unsaturated aliphatic, cycloaliphatic, and aromatic compounds having up to about 36 carbon atoms that include a functional group capable of further reaction, such as a hydroxyl, amino, azlactone, oxazolinyl, 3-oxobutanoyl (i.e., acetoacetyl), carboxyl, isocyanato, epoxy, aziridinyl, acyl halide, vinyloxy, or cyclic anhydride group.

Preferred functional monomers have the general formula

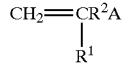

wherein $R^1$ is hydrogen, a $C_1$ to $C_4$ alkyl group, or a phenyl group, preferably hydrogen or a methyl group; $R^2$ is a single bond or a divalent linking group that joins an ethylenically unsaturated group to functional group A and preferably contains up to 34, preferably up to 18, more preferably up to 10, carbon and, optionally, oxygen and nitrogen atoms and, when $R^2$ is not a single bond, is preferably selected from

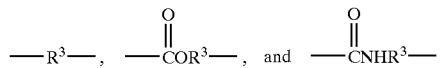

in which $R^3$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and A is a functional group, capable of reaction with a co-reactive functional group (which is part of an unsaturated monomer) to form a covalent bond, preferably selected from the class consisting of hydroxyl, amino (especially secondary amino), carboxyl, isocyanato, aziridinyl, epoxy, acyl halide, vinyloxy, azlactone, oxazolinyl, acetoacetyl, and cyclic anhydride groups.

Representative hydroxyl group-substituted functional monomers include the hydroxyalkyl (meth)acrylates and hydroxyalkyl (meth)acrylamides such as 2-hydroxyethyl (meth)acrylate, 2-hydroxypropyl (meth)acrylate, 3-chloro-2-hydroxypropylmethyl (meth)acrylate, 2-hydroxyethyl (meth)acrylamide, 4-hydroxycyclohexyl (meth)acrylate, 3-acryloyloxyphenol, 2-(4-acryloyloxyphenyl)-2-(4-hydroxyphenyl)propane (also called bisphenol A monoacrylate), 2-propyn-1-ol, and 3-butyn-1-ol.

Representative amino group-substituted functional monomers include 2-methyl aminoethyl methacrylate, 3-aminopropyl methacrylate, 4-aminocyclohexyl methacrylate, N-(3-aminophenyl)acrylamide, 4-aminostyrene, N-acryloylethylenediamine, and 4-aminophenyl-4-acrylamidophenylsulfone.

Representative azlactone group-substituted functional monomers include 2-ethenyl-1,3-oxazolin-5-one; 2-ethenyl-4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-3-oxa-1-aza[4.5]

spirodec-1-ene-4-one; 2-ethenyl-5,6-dihydro-4H-1,3-oxazin-6-one; 2-ethenyl-4,5,6,7-tetrahydro-1,3-oxazepin-7-one; 2-isopropenyl-5,6-dihydro-5,5-di(2-methylphenyl)-4H-1,3-oxazin-6-one; 2-acryloyloxy-1,3-oxazolin-5-one; 2-(2-acryloyloxy)ethyl-4,4-dimethyl-1,3-oxazolin-5-one; 2-ethenyl-4,5-dihydro-6H-1,3-oxazin-6-one, and 2-ethenyl-4,5-dihydro-4,4-dimethyl-6H-1,3-oxazin-6-one.

Representative oxazolinyl group-substituted functional monomers include 2-vinyl-2-oxazoline, 2-isopropenyl-2-oxazoline, 2-(5-hexenyl)-2-oxazoline, 2-acryloxy-2-oxazoline, 2-(4-acryloxyphenyl)-2-oxazoline, and 2-methacryloxy-2-oxazoline.

Representative acetoacetyl group-substituted functional monomers include 2-(acetoacetoxy)ethyl (meth)acrylate, styryl acetoacetate, isopropenyl acetoacetate, and hex-5-enyl acetoacetate.

Representative carboxyl group-substituted functional monomers include (meth)acrylic acid, 3-(meth)acryloyloxy-propionic acid, 4-(meth)acryloyloxy-butyric acid, 2-(meth)acryloyloxy-benzoic acid, 3-(meth)acryloyloxy-5-methyl benzoic acid, 4-(meth)acryloyloxymethyl-benzoic acid, phthalic acid mono-[2-(meth)acryloyloxy-ethyl]ester, 2-butynoic acid, and 4-pentynoic acid.

Representative isocyanate group-substituted functional monomers include 2-isocyanatoethyl (meth)acrylate, 3-isocyanatopropyl (meth)acrylate, 4-isocyanatocyclohexyl (meth)acrylate, 4-isocyanatostyrene, 2-methyl-2-propenoyl isocyanate, 4-(2-acryloyloxyethoxycarbonylamino)phenylisocyanate, allyl 2-isocyanatoethylether, and 3-isocyanato-1-propene.

Representative epoxy group-substituted functional monomers include glycidyl (meth)acrylate, thioglycidyl (meth)acrylate, 3-(2,3-epoxypropxy)phenyl (meth)acrylate, 2-[4-(2,3-epoxypropoxy)phenyl]-2-(4-acryloyloxy-phenyl) propane, 4-(2,3-epoxypropoxy)cyclohexyl (meth)acrylate, 2,3-epoxycyclohexyl (meth)acrylate, and 3,4-epoxycyclohexyl (meth)acrylate.

Representative aziridinyl group-substituted functional monomers include N-(meth)acryloylaziridine, 2-(1-aziridinyl)ethyl (meth)acrylate, 4-(1-aziridinyl)butyl (meth)acrylate, 2-[2-(1-aziridinyl)ethoxy]ethyl (meth)acrylate, 2-[2-(1-aziridinyl)ethoxycarbonylamino]ethyl (meth)acrylate, 12-[2-(2,2,3,3-tetramethyl-1-aziridinyl)ethoxycarbonylamino]dodecyl (meth)acrylate, and 1-(2-propenyl)aziridine.

Representative acyl halide group-substituted functional monomers include (meth)acryloyl chloride, α-chloroacryloyl chloride, acryloyloxyacetyl chloride, 5-hexenoyl chloride, 2-(acryloyloxy) propionyl chloride, 3-(acryloylthioxy) propionoyl chloride, and 3-(N-acryloyl-N-methylamino) propionoyl chloride.

Representative vinyloxy group-substituted functional monomers include 2-(ethenyloxy)ethyl (meth)acrylate, 3-(ethynyloxy)-1-propene, 4-(ethynyloxy)-1-butene, and 4-(ethenyloxy)butyl-2-acrylamido-2,2-dimethylacetate.

Representative anhydride group-substituted functional monomers include maleic anhydride, acrylic anhydride, itaconic anhydride, 3-acryloyloxyphthalic anhydride, and 2-methacryloxycyclohexanedicarboxylic acid anhydride.

It will be understood in the context of the above description of the first and second solute polymers, that the ethylenically-unsaturated monomer possessing a reactive functional group ("reactive monomer") is chosen such that the first and second components are mutually co-reactive so that the first solute polymer has a pendant functional group that is co-reactive with the pendant functional group of the second component. The reactive and co-reactive functional groups form a crosslink between the first and second components by forming a linking group between the electrophilic and nucleophilic functional group pairs, and may include reactions commonly referred to as displacement, condensation and addition reactions, rather than polymerization of ethylenically-unsaturated groups.

While it is within the scope of the invention to employ nucleophile-electrophile combinations that react by displacement of some leaving group and creation of a by-product molecule, the removal of by-products requires an additional processing step. It is preferred that the nucleophile-electrophile combinations react by an addition reaction in which no by-product molecules are created, and the exemplified reaction partners react by this preferred mode. Exemplary combinations include hydroxyl or amino functional groups reacting with azlactone-, isocyanate-, and anhydride-functional groups and carboxyl groups reacting with isocyanate- and oxazoline-functional groups.

To aid in the understanding of this interaction between reactive first and co-reactive second functional groups, Table 1 summarizes some possible combinations of functional groups, using carboxyl and hydroxyl groups as representative examples. Those skilled in the art will readily recognize how other previously described functional groups also can be used to form covalent linking groups.

TABLE I

| Functional group | | Co-reactive functional group | | Resultant linking group |
|---|---|---|---|---|
| carboxyl | $-\overset{O}{\underset{\|}{C}}OH$ | oxazolinyl | [oxazoline ring structure with $R^{12}$ groups] | $-CO-\overset{R^{12}}{\underset{R^{12}}{C}}-\overset{R^{12}}{\underset{R^{12}}{C}}-NHC-$ |
| | | vinyloxy | $R^{13}HC=C\overset{R^{14}}{\underset{O-}{\diagdown}}$ | $-\overset{O}{\underset{\|}{C}}O\overset{CH_2R^{13}}{\underset{R^{14}}{C}}O-$ |

TABLE I-continued

| Functional group | Co-reactive functional group | Resultant linking group |
|---|---|---|
| | aziridinyl $\quad R^{12}-\underset{R^{12}}{\overset{R^{12}}{\underset{|}{C}}}\underset{R^{12}}{\overset{|}{\underset{|}{C}}}N-$ | $-\underset{\parallel}{\overset{O}{C}}OC-\underset{R^{12}}{\overset{R^{12}}{\underset{|}{C}}}\underset{R^{12}}{\overset{|}{\underset{|}{C}}}NH-$ |
| | epoxy $\quad R^{12}-\overset{O}{\overset{\triangle}{C-C}}-\underset{R^{12}}{\overset{|}{\underset{|}{}}}\underset{R^{12}}{\overset{|}{\underset{|}{}}}$ | $-\underset{\parallel}{\overset{O}{C}}OC-\underset{R^{12}}{\overset{R^{12}}{\underset{|}{C}}}\underset{R^{12}}{\overset{OH}{\underset{|}{C}}}-$ |
| hydroxyl —OH | isocyanato $\quad$ O=C=N— | —OCNH— $\parallel$ O |
| | acid halide $\quad \underset{\parallel}{\overset{O}{XC}}-$ | $-\underset{\parallel}{\overset{O}{OC}}-$ |
| | azlactone $\quad R^{12}\underset{R^{12}}{\overset{(C)_n}{\underset{|}{}}}\overset{N=C}{\underset{O}{\underset{\parallel}{C}}}$ <br> n = 1 or 2 | $-\underset{\parallel}{\overset{O}{OC}}-(C)_n-\underset{\parallel}{\overset{O}{NHC}}-$ <br> $\quad R^{12}$ |
| | (thio)epoxy $\quad R^{12}-\overset{G}{\overset{\triangle}{C-C}}-\underset{R^{12}}{\overset{|}{\underset{|}{}}}\underset{R^{12}}{\overset{|}{\underset{|}{}}}$ <br> G = O or S | $-\underset{R^{12}}{\overset{R^{12}}{\underset{|}{OC}}}-\underset{R^{12}}{\overset{G—H}{\underset{|}{C}}}-$ |

In Table I, each $R^{12}$ is independently hydrogen, an alkyl group having 1 to 4 carbon atoms, or a phenyl group. $R^{13}$ and $R^{14}$ are independently hydrogen or an alkyl group containing from 1 to about 4 carbon atoms, although $R^{13}$ and $R^{14}$ preferably are not both alkyl groups.

Representative examples of free-radically polymerizable polar monomers having at least one ethylenically unsaturated polymerizable group which are copolymerizable with acrylate and functional monomers include strongly polar copolymerizable monomers including but not limited to those selected from the group consisting of substituted (meth)acrylamides, N-vinyl pyrrolidone, N-vinyl caprolactam, acrylonitrile, tetrahydrofurfuryl acrylate, acrylamides, and mixtures thereof, and the like.

The selection of the other monomers useful in preparing the functional syrup polymer(s) (of the first and second components) and to provide additional solvent monomers (third component) for the syrup polymer(s) is done in such a manner that the ultimate crosslinked pressure sensitive adhesive has sufficient conformability, tack, and adhesion to form a bond to a substrate at room temperature. One measure of a psa's ability to conform to an substrate sufficiently at room temperature and to form an adhesive bond is the material's glass transition temperature ($T_g$). A useful, guiding principal is that a psa interpolymer should have a $T_g$ of −15° C. (258° K) or lower in order for effective adhesive application at room temperature. A useful predictor of interpolymer $T_g$ for specific combinations of various monomers can be computed by application of Equation (1) (obtained from W. R. Sorenson and T. W. Campbell's text entitled "Preparative Methods of Polymer Chemistry", Interscience: New York (1968), p. 209).

$$\frac{1}{T_g} = \sum_{n=1}^{1} \frac{W_i}{T_g i} \qquad \text{(Equation 1)}$$

wherein $T_g$=Glass transition temperature in degrees Kelvin for the interpolymer $T_g i$=Glass transition temperature in degrees Kelvin for the homopolymer of the ith monomer $W_i$=Weight fraction of the ith monomer Specific values for $T_g$'s of appropriate homopolymers can be obtained from P. Peyser's chapter in "Polymer Handbook", 3rd edition, edited by J. Brandrup and E. H. Immergut, Wiley: New York (1989), pp. VI-209 through VI-277.

Useful "other monomers" include vinyl monomers such as vinyl acetate, styrenes, and alkyl vinyl ethers; and alkyl methacrylates. Useful "other monomers" may also include various polyunsaturated monomers, including addition products or copolymers or oligomers comprising two different functional monomers (as defined previously) such that the product/copolymer/oligomer exhibits the functionality of both of the constituent starting materials/monomers. Examples of useful polyfunctional compounds include allyl, propargyl and crotyl (meth)acrylates; ethylene di(meth) acylate; 1,6-hexanediol diacrylate (HDDA), trimethylol propane triacrylate; pentaerythritol triacrylate; allyl-2-acrylamido-2,2-dimethyl acetate and the like.

Useful polyfunctional compounds (as the second component) have an average functionality (average number of functional groups per molecule) of greater than one, preferably greater than two and most preferably greater than 3. The functional groups are chosen to be co-reactive with the pendant functional groups on the first solute polymer, and may be nucleophilic or electrophilic. Useful functional groups include those described for the first solute polymer and include, but are not limited to hydroxyl, amino (especially secondary amino), carboxyl, isocyanato, aziridinyl, epoxy, acyl halide, vinyloxy, azlactone, oxazolinyl, acetoacetone, and cyclic anhydride groups. Useful polyfunctional compounds have the general formula R-$(Z)_n$ where Z is a functional group, n is greater than 1 and R is an organic radical having a valency of n. Preferably R is an alkyl radical of valency n which may be linear or branched. Most preferred functional groups for polyfunctional compounds are those having hydroxyl, isocyanato, aziridinyl and azlactone functional groups.

Dendritic polymers are preferred polyfunctional compounds and include any of the known dendritic architectures including dendrimers, regular dendrons, dendrigrafts, and hyperbranched polymers. Dendritic polymers are polymers with densely branched structures having a large number of end reactive groups. A dendritic polymer includes several layers or generations of repeating units which all contain one or more branch points. Dendritic polymers, including dendrimers and hyperbranched polymers, can be prepared by condensation, addition, or ionic reactions of monomeric units having at least two different types of reactive groups.

Dendritic polymers are comprised of a plurality of dendrons that emanate from a common core, which core usually comprises a group of atoms. Dendritic polymers generally consist of peripheral surface groups, interior branch junctures having branching functionalities greater than or equal to two, and divalent connectors that covalently connect neighboring branching junctures.

Dendrimers can be prepared by convergent or divergent synthesis. Divergent synthesis of dendrimers involves a molecular growth process which occurs through a consecutive series of geometrically progressive step-wise additions of branches upon branches in a radially outward molecular direction to produce an ordered arrangement of layered branch generations, in which each macromolecule includes a core generation, one or more layers of internal generations, and an outer layer of surface generations, wherein each of the generations includes a single branch juncture. The generations can be the same or different in chemical structure and branching functionality. The surface branch generations may contain either chemically reactive or passive functional groups. Chemically reactive surface groups can be used for further extension of dendritic growth or for modification of dendritic molecular surfaces. The chemically passive groups may be used to physically modify dendritic surfaces, such as to adjust the ratio of hydrophobic to hydrophilic terminals. Convergent synthesis of dendrimers involves a growth process which begins from what will become the surface of the dendrimers and progresses radially in a molecular direction toward a focal point or core.

Dendrons and dendrimers may be ideal or non-ideal, i.e., imperfect or defective. Imperfections are normally a consequence of either incomplete chemical reactions or unavoidable competing side reactions.

Hyperbranched polymers can be prepared by one-pot polymerization reaction of a single type of monomer having a single reactive group of a first type (B) and a plurality (y) of reactive groups of a second type (A), i.e., a B—$A_y$ type monomer, which is initiated by a core having a plurality (x) of the A type reactive groups, wherein A groups can react with B groups but not other A groups, and B groups cannot react with other B groups. The one-pot synthesis method for hyperbranched polymers is simpler and less expensive than the divergent and convergent synthesis methods for dendrimers. However, the one-pot synthesis method lacks reaction control, which leads to more polydisperse products with larger deviations from ideal dendron structure.

Hyperbranched polymers are dendritic polymers that contain high levels of non-ideal irregular branching arrays as compared with the more nearly perfect regular structure dendrimers. Specifically, hyperbranched polymers contain a relatively high number of irregular branching arrays in which not every repeat unit contains a branch juncture. Consequently, hyperbranched polymers may be viewed as intermediate between linear polymers and dendrimers. Yet they are dendritic because of their relatively high branch-juncture content per individual macromolecule.

The preparation and characterization of dendrimers, dendrons, dendrigrafts, and hyperbranched polymers, is well known. Examples of dendrimers and dendrons, and methods of synthesizing the same are set forth in U.S. Pat. Nos. 4,507,466; 4,558,120; 4,568,737; 4,587,329; 4,631,337; 4,694,064; 4,713,975; 4,737,550; 4,871,779 and 4,857,599. Examples of hyperbranched polymers and methods of preparing the same are set forth, for example, in U.S. Pat. No. 5,418,301. Some dendritic polymers are also commercially available. For example, 3- and 5-generation hyperbranched polyester polyols may be obtained from Perstorp Polyols, Inc., Toledo, Ohio.

More generally, dendritic polymers or macromolecules are characterized by a relatively high degree of branching (DB), which is defined as the number average fraction of branching groups per molecule, i.e., the ratio of terminal groups plus branch groups to the total number of terminal groups, branch groups and linear groups. For dendrimers, the degree of branching is one. For linear polymers the degree of branching approaches zero. Hyperbranched polymers have a degree of branching that is between that of linear polymers and ideal dendrimers. The dendritic polymers used in this invention preferably have a degree of branching which is at least equal to 0.1, more preferably greater than 0.4, and most preferably greater than 0.5.

As previously described, the composition of the present invention comprises a first solute polymer with a plurality of pendant reactive functional groups, a second component comprising co-reactive functional groups, a monomer mixture and optionally an initiator. Formation of the composition (i.e., the bringing together of the three components, and the photoinitiator) can be accomplished in several ways. Preferably, they are brought together after the first solute polymer has been separately prepared.

The first solute polymer can be prepared (e.g., by solution polymerization followed by isolation) and then added to a separately prepared second and third component mixture. Depending on the type of coating process to be used, the relative amounts of the solute polymer(s) and third monomer component can vary greatly. For example, where the coating is to be done by a solvent or hot-melt process, the relative amount of the first and second components preferably is relatively high. However, where coating is to be done by a syrup application process, the relative amount of polymer preferably is low.

The coatable syrup polymer is prepared by combining the three component composition containing the first solute polymer, the second component and the third component monomer. Polymerization may be necessary to achieve a thickened solution exhibiting a coatable viscosity of from about 500–10,000 cPs at 22° C., more preferably from about 750 to 7500 cPs.

In general, the order of addition is conducted so as to minimize the reaction between the reactive and co-reactive functional groups prior to coating and thus maximize the useful shelf life or "open time", i.e. the time during which the adhesive is applied to a first substrate (such as a tape backing) and remains sufficiently tacky to effect a bond between the first substrate and a second substrate. Once the open time has been exceeded, the second substrate cannot be readily bonded to the first substrate. Long open times are generally preferred. Shelf life refers to the amount of time the syrup polymer may be stored without premature gelation.

To avoid premature gelation it is generally advantageous to avoid having both reactive and co-reactive groups on the first polymer component, or having both reactive and co-reactive groups on the second component. If the reactive and co-reactive groups are not highly reactive, i.e. do not react at appreciable rates at either ambient temperature or in the absence of a catalyst, then one may accommodate the reactive and co-reactive groups on the first polymer component. Similarly, if the relative concentrations of either the reactive or co-reactive function groups are low, then the two will not react at appreciable rates and gelation may be avoided. However, where the two do react at significant rates, gelation may be avoided by adding one of the components just prior to coating.

The syrup polymer solution may be coated onto backings at useful and relatively time-stable thicknesses ranging from 25–500 micrometers or more. Stable thicknesses are necessary to maintain the desired coating thickness prior to further polymerization and crosslinking of the syrup polymer to form the crosslinked pressure sensitive adhesives. Coating can be accomplished by any conventional means such as roller, dip, knife, or extrusion coating. The use of a composition of a coatable viscosity provides the advantage of allowing the remaining monomer(s) to be polymerized after they have been applied to a substrate.

A preferred method of preparing a pressure sensitive adhesive article comprises partially polymerizing the novel syrup polymer composition to a useful coating viscosity, coating the partially polymerized syrup polymer composition onto a substrate (such as a tape backing) and further polymerizing the syrup polymer. Partial polymerization provides a coatable solution of the first and second solute polymers in one or more third component solvent monomers.

For syrup application processing, a preferred monomer mixture (third component) comprises 50 to 100 pbw of one or more acrylate ester monomers, 0 to 50 pbw of one or more polar monomers, and, per 100 pbw of the acrylate ester and polar monomers, 0 to about 20 pbw of a functional monomer, and 0 to about 20 pbw of "other monomers", including 0 to 0.5 pbw of polyunsaturated monomers.

The polymerizations may be conducted in the presence or preferably in the absence of suitable solvents such as ethyl acetate, toluene and tetrahydrofuran which are unreactive with the functional groups of the components of the syrup polymer.

Polymerization of the monomer components may be used to form the second solute polymer in situ. This method of forming the composition of the present invention has the advantage of allowing for compositions in which very high molecular weight polymers are dissolved in a monomer mixture.

Polymerization can be accomplished by exposing the syrup polymer composition to energy in the presence of a photoinitiator. Energy activated initiators may be unnecessary where, for example, ionizing radiation is used to initiate polymerization. These photoinitiators can be employed in concentrations ranging from about 0.0001 to about 3.0 pbw, preferably from about 0.001 to about 1.0 pbw, and more preferably from about 0.005 to about 0.5 pbw, per 100 pbw of the third component solvent monomer.

A preferred method of preparation of the coatable syrup polymer is photoinitiated free radical polymerization. Advantageously, a photoinitiated process generally generates enough heat to effect the reaction between the reactive and co-reactive functional groups to crosslink the polymers and produce a pressure sensitive adhesive. Additional advantages of the photopolymerization method are that 1) heating the monomer solution is unnecessary and 2) photoinitiation is stopped completely when the activating light source is turned off.

Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion. When solvent is used, the solvent may be removed (for example by vacuum distillation) either before or after formation of the syrup polymer. While an acceptable method, this procedure involving a highly converted functional polymer is not preferred because an additional solvent removal step is required, another material may be required (the non-monomeric solvent), and dissolution of the high molecular weight, highly converted solute polymer in the monomer mixture may require a significant period of time.

If so desired, the extent of polymerization can be monitored by measuring the refractive index of the composition/viscoelastomeric material especially in bulk. Refractive index changes linearly with respect to conversion. This monitoring method is commonly applied in polymerization kinetics work. See discussions about the method in, for example, G. P. Gladyshev and K. M. Gibov, *Polymerization at Advanced Degrees of Conversion*, Keter Press, Jerusalem (1970).

Useful photoinitiators include benzoin ethers such as benzoin methyl ether and benzoin isopropyl ether; substituted acetophenones such as 2,2-diethoxyacetophenone, available as Irgacure™ 651 photoinitiator (Ciba-Geigy Corp.; Ardsley, N.Y.), 2,2-dimethoxy-2-phenyl-1-phenylethanone, available as Esacure™ KB-1 photoinitiator (Sartomer Co.; West Chester, Pa.), and dimethoxyhydroxy-acetophenone; substituted (α-ketols such as 2-methyl-2-hydroxy propiophenone; such as 2-naphthalene-sulfonyl chloride; such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Norrish type 1 photocrosslinkers, especially α-cleaving type photoinitiators, are preferred. The photoinitiator can be added to the mixture to be coated after the first solute polymer has been formed (i.e., photoinitiator can be added to the syrup polymer mixture. Such polymerizable photoinitiators are described, for example, in U.S. Pat. Nos. 5,902,836 (Babu et al.) and 5,506,279 (Babu et al.), the disclosures of which are herein incorporated by reference.

The syrup polymer composition and the photoinitiator may be irradiated with activating UV radiation to polymerize the monomer component(s). UV light sources can be of two types: 1) relatively low light intensity sources such as Blacklights which provide generally 10 mW/cm² or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm², preferably between 15 and 450 mW/cm². Where actinic radiation is used to fully or partially polymerize the syrup polymer composition, high intensities and short exposure times are preferred. For example, an intensity of 600 mW/cm² and an exposure time of about 1 second may be used successfully. Intensities can range from about 0.1 to about 150 mW/cm², preferably from about 0.5 to about 100 mW/cm², and more preferably from about 0.5 to about 50 mW/cm Accordingly, relatively thick coatings (e.g., at least about 0.05 mm, preferably at least about 0.10 mm, more preferably at least about 0.15 mm thick) can be achieved when the extinction coefficient of the photoinitiator is low. Coatings from of 0.5 up to 2 mm thick are possible and are within the scope of the present invention. Such photoinitiators preferably are present in an amount of from 0.1 to 1.0 pbw per 100 pbw of the syrup polymer composition.

The degree of conversion can be monitored during the irradiation by measuring the index of refraction of the polymerizing medium as previously described. Useful coating viscosities are achieved with conversions (i.e. the percentage of available monomer polymerized) in the range of up to 30%, preferably 2–20%, more preferably from 5–15%, and most preferably from 7–12%. The molecular weight (weight average) of the solute polymer(s) is at least 100,000, preferably at least 500,000, and more preferably at least 1,000,000.

When preparing a psa of the invention, it is expedient for the photoinitiated polymerization reactions to proceed to virtual completion, i.e., depletion of the monomeric components, at temperatures less than about 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup polymer and formation of the crosslinked pressure sensitive adhesives of the invention. Free radical polymerization inhibitors are often required at processing temperatures of 70° C. and higher for reaction periods of more than about 6 hours.

Use of a stoichiometric excess of a component containing a functional group or a co-reactive functional group may be useful to achieve sufficient reaction between functional groups under the above specified conditions. Stoichiometric excesses of even 10-fold represent minor amounts on a comparative weight basis to whole the pressure sensitive adhesive. Catalysts may be used to enhance rates of addition reaction between reactive and co-reactive functional groups and to effect the crosslinking of the syrup polymer components. Metal catalysts such as dibutyltin dilaurate and dibutyltin diacetate are effective with alcohol-isocyanate combinations. Strong acids such as ethanesulfonic acid and methanesulfonic acid are useful with azlactone-alcohols and with the anhydride-alcohols. Effective concentrations of the catalytic agents are from 0.01 to 5.00 weight percent based on the concentration of the stoichiometrically limiting reactant.

In addition to the ingredients mentioned above, the syrup polymer composition may include certain other materials such as pigments, tackifiers and reinforcing agents. However, the addition of any such material adds complexity and hence expense to an otherwise simple, straightforward, economical composition and process and is not preferred except to achieve specific results.

EXAMPLES

Test Methods

The test methods used to evaluate the PSA materials of the examples are industry standard tests. The standard tests are described in detail in various publications of the American Society for Testing and Materials (ASTM), Philadelphia, Pa. and the Pressure Sensitive Tape Council (PSTC), Chicago, Ill. The standard test methods are described in detail below. The reference source of each of the standard test methods is also given.

1. Shear Strength (ASTM D-3654M-96e1; PSTC-7)

Shear strength is a measure of the cohesive strength of an adhesive. It is based upon the amount of force required to pull an adhesive strip from a standard flat surface in a direction parallel to the surface to which it has been affixed with a definite pressure. It is measured in units of time (minutes) required to pull a standard area of PSA coated sheet material from a stainless steel panel under stress of a constant, standard load.

The tests were conducted on adhesive coated strips applied to a stainless steel panel such that a 12.7 mm by 25.4 mm portion of each strip was in firm contact with the panel with one end portion of the tape being free. The panel with adhesive coated strip attached was held in a rack such that the coated surface of the panel forms an angle of 182° C. with the free end of the vertical tape which was then tensioned by application of a force of one kilogram applied as a hanging weight from the free end of the coated strip. The 2° greater than 180° was used to negate peel forces, thus ensuring that only the shear forces were measured in order to more accurately determine the holding power of the tape being tested. Time lapsed for each test specimen to separate from the steel panel was recorded as the shear strength. If no failure had occurred after 10,000 minutes, the test was discontinued and the value recorded as ">10,000". The shear strength of the adhesives was measured at room temperature (e.g., about 22° C.) and at 70° C.

2. 180° Peel (ASTM D 3330M-96e1; PSTC-1, 12$^{th}$ Ed., 1996)

Peel adhesion is the force required to remove a PSA coated test specimen from a test panel measured at specific angle and rate of removal. In the examples, this force is expressed in Newtons per decimeter (N/dm) width of coated sheet. The procedure followed was:

1) A test specimen 25.4 mm wide was applied to a horizontally positioned clean glass test plate. A 2.2 kg rubber roller was used to press a the specimen into firm contact with the glass surface.
2) The free end of the specimen was doubled back nearly touching itself so the angle of removal was 180°. The free end was attached to the adhesion tester scale.
3) The glass test plate was clamped in the jaws of tensile testing machine capable of moving the plate away from the scale at a constant rate of 25 cm/min.

4) The scale reading in Newtons was recorded as the tape was peeled from the glass surface.

3. Percent Gel Test (ASTM D 3616–95)

The percent gel was used as an indication of cure level. Crosslinking by radiation improves the creep and shear resistance of pressure-sensitive adhesives. Many important properties of crosslinked pressure-sensitive adhesives vary with the gel content. Hence, determination of the gel content provides a means for controlling the process and thereby raising the quality of the tape.

Extraction tests permit verification of the proper gel content of acrylate PSAs and they also permit comparison between different crosslinked adhesives and their specific end uses.

Gel Content Determination

A square test specimen (3.81 cm×3.81 cm) containing approximately 0.06 g of PSA was cut from the tape and placed in a 120-mesh stainless steel basket measuring approximately 4×13 cm. The contents were weighed to the nearest 0.1 mg and then immersed in a capped beaker containing sufficient toluene to cover the specimen. After extraction for 24 to 48 hours, the basket (containing the specimen) was removed, drained, and placed in an oven at 93° C. The basket and specimen were dried to a constant weight and the gel content was determined as follows:

$$\text{Extract \%} = \frac{\text{weight lost during extraction}}{\text{weight of original specimen}} \times 100$$

Gel content = 100 − percent extract

Two specimens of each tape were tested and the results were averaged to obtain the gel content value.

4. Probe Tack (ASTM D2979–95)

Pressure sensitive tack is a measure of the ability to form a bond with the surface of another material upon brief contact under light pressure. In the examples, this ability was measured using a Polyken Probe Tack Tester (Kendall-Polyken, Mansfield, Mass.) as the force in grams required to separate a standard ½ cm diameter stainless steel probe from an adhesive-coated flexible sheet at a rate of separation of 1 cm/sec after contacting the adhesive for 1 sec at a pressure of 100 g/cm$^2$. Reported values are the average of 10 readings.

All materials were obtained from or are available from Aldrich Chemical Co., Milwaukee, Wis.

Stock Monomer Mixture

For all examples below, a stock monomer mixture was prepared, containing 90 parts by weight isooctyl acrylate (IOA), 10 parts by weight acrylic acid (AA) and 0.04 parts by weight 2,2-dimethoxy-2-phenylacetophenone (KB-1™ photoinitiator, Sartomer Co. Inc., Exton, Pa.).

Synthesis of Vinyldimethylazlactone/Hydroxyethyl Acrylate Adduct (VDHE)

To a 100 ml round bottom flask were added 3.61 g 2-vinyl-4,4-dimethylazlactone (VDM) (SNPE, Inc; Princeton, N.J.), 3.01 g 2-hydroxyethyl acrylate and 20 mL heptane. The solution was magnetically stirred at room temperature (23 C) while 0.2 g 1,8-diazabicyclo[5.4.0]undec-7-ene (DBU) was added. DBU addition caused immediate warming. Solid product formed in 30 minutes. The solid was collected by filtration, washed with cold heptane and dried in vacuo. A total of 6.01 g was collected. IR and NMR spectroscopy were used to identify the product.

Comparative Examples

A sample of 100.04 g of the stock solution was partially photopolymerized in bulk in a nitrogen atmosphere by UV radiation using 40-watt fluorescent black light bulbs (Osram Sylvania Inc., Danvers, Mass.) such that the resulting syrup had a Brookfield viscosity of approximately 1500 cp. To the syrup was added, with thorough mixing, portions of hexanedioldiacrylate (HDDA) ranging from 0.02 g to 0.24 g and 0.16 g KB-1™ photoinitiator. The syrup was knife coated onto 40 μm thick poly(ethylene terephthalate) release liner film (T-30™ film, CT Film, Clearfield, Utah) at a coating thickness of about 0.075 mm. The adhesives were cured as described in Example 1. The peel and shear data are shown in Table C as Samples C-1, C-2, and C-3.

Further comparative examples were prepared by mixing the syrup with portions of VDHE ranging from 0.02 g to 0.24 g and 0.16 g KB-1™ photoinitiator, then coating and curing as described previously. The peel and shear data are shown in Table C as Samples C-4, C-5, and C-6.

TABLE C

| Sample | HDDA, g | VDHE, g | Peel, N/dm | Shear Strength, Min 23° C. | 70° C. | Probe Tack, g |
|---|---|---|---|---|---|---|
| C-1 | 0.02 | — | 75 | 2500 | 128 | 978 |
| C-2 | 0.06 | — | 69 | 3678 | 106 | 890 |
| C-3 | 0.24 | — | 58 | >10,000 | 380 | 769 |
| C-4 | — | 0.02 | 79 | 1508 | 35 | 1012 |
| C-5 | — | 0.06 | 76 | 2679 | 110 | 989 |
| C-6 | — | 0.24 | 69 | 7896 | 159 | 890 |

Comparative examples C-1 to C-6 exhibited inadequate shear strength at an elevated temperature when either diacrylate (HDDA or VDHE) was added to the syrup.

Example 1

To 100.04 g of the stock solution was added, with thorough mixing, portions of VDM ranging from 0.24 to 2.4 g, as shown in Table 1. Each mixture was partially photopolymerized in bulk in a nitrogen atmosphere by UV irradiation using 40-watt fluorescent black light bulbs such that the resulting syrup had a Brookfield viscosity of approximately 1500 cps.

To the syrup was added, with thorough mixing, portions of 2-hydroxyethyl acrylate (HEA) ranging from 0.2 to 2.0 g, and 0.16 g KB-1™ photoinitiator. The syrup mixtures were knife coated onto 40 μm thick poly(ethylene terephthalate) (PET) release liner film at a coating thickness as shown in Table 1. The coating was exposed to UV irradiation at approximately 300–400 nm wavelength at 2.2 mW/cm$^2$, providing approximately 250 mJ/cm$^2$ irradiation energy, sufficient to cure the coating into a pressure sensitive adhesive. The adhesive coating was then transfer laminated to a primed poly(ethyleneterephthalate) backing (HOSTAPHAN 3SAB™ film, Mitsubishi Polyester Film, LLC. Greer, S.C.) and the adhesive properties were measured.

Properties of the cured adhesives are shown in Table 1.

TABLE 1

| Sample | VDM, g | HEA, g | Thickness, mm | 180° Peel, N/dm | Shear, 23° C., min | Shear, 100° C., min | Probe Tack, g |
|---|---|---|---|---|---|---|---|
| 1 | 0.24 | 0.2 | 0.075 | 72 | >10000 | 44[1] | 630 |
| 2 | 1.19 | 1 | 0.085 | 71 | >10000 | >10000 | 907 |
| 3 | 2.4 | 2 | 0.058 | 69 | >10000 | >10000 | 706 |

[1]Adhesive transfer to plate and backing

The data of Table 1 shows that PSAs with high shear strength at both ambient and elevated temperatures was made from coatable compositions without sacrificing the peel adhesion when the reactions were involved through functional groups. The samples of Example 1 exhibited PSA properties superior to those of Comparative Examples C-1 to C-6.

Example 2

The procedure described in Example 1 was repeated, except that smaller amounts of VDM and HEA were added (shown in Table 2), and 0.08 g of hexanediol diacrylate (HDDA) was added to each syrup along with the HEA. Properties of the cured adhesives are shown in Table 2. For each sample, shear times for a 1 Kg weight at 70° C. were greater than 10,000 minutes.

TABLE 2

| Sample | VDM, g | HEA, g | Thickness, mm | 180° Peel, N/dm | Gel % | Probe Tack, g |
|---|---|---|---|---|---|---|
| 4 | 0.024 | 0.02 | 0.058 | 70 | 96 | 805 |
| 5 | 0.06 | 0.05 | 0.063 | 52 | 97 | 830 |
| 6 | 0.12 | 0.1 | 0.063 | 58 | 97 | 765 |

The data of Table 2 show that acceptable adhesive performance was obtained using formulations containing small amounts of VDM, HEA and a multifunctional acrylate crosslinker, HDDA.

Example 3

Sample 3 of Example 1 was further treated as follows: After the final UV cure, the adhesive was heated at 100° C. for the times indicated in Table 3, then applied to the glass plate. Peel strengths and percent gel were determined for each sample.

TABLE 3

| Sample | Time, min | 180° Peel, N/dm | % Gel |
|---|---|---|---|
| 3 | 0 | 69 | — |
| 7 | 10 | 45 | 98 |
| 8 | 30 | 36 | 98 |
| 9 | 60 | 28 | 98 |
| 10 | 120 | 29 | 99 |

The data of Table 3 show that a decrease in peel adhesion occurred on prolonged heating of the adhesive, indicative of further crosslinking, although gel content was not significantly affected.

Example 4

An adhesive was prepared as described in Example 1, except that 5.0 g of VDM was added prior to syrup formation, and 5.0 g of HEA was added after syrup formation. The final formulation was coated on a primed PET backing film, cured with UV light as described in Example 1, then applied to a glass plate. The construction was heated at 100° C. for 60 minutes, then cooled to 23° C. The sample showed a 180° peel value of 101 N/dm, compared to a peel value of 72 N/dm for an unheated sample. This Example showed that an adhesive having the strength approaching that of a structural adhesive may be prepared from formulations of the present invention.

Example 5

To 100.04 g of the stock solution was added, with thorough mixing, portions of 2-hydroxyethyl acrylate (HEA) ranging from 0.2 to 2.0 g, as shown in Table 5. Each mixture was partially photopolymerized in bulk in a nitrogen atmosphere by UV irradiation using 40-watt fluorescent bulbs such that the resulting syrup had a Brookfield viscosity of approximately 1500 cps.

To the syrup was added, with thorough mixing, portions of 2-vinyl-4,4-dimethyl-2-oxazoline-5-one (vinyldimethylazlactone (VDM) ranging from 0.24 to 2.4 g, and 0.16 g KB-1™ photoinitiator. The syrup mixtures were knife coated onto 40 μm thick poly(ethylene terephthalate) release liner film at a coating thickness as shown in Table 5. The coating was exposed to UV irradiation at approximately 300–400 nm wavelength at 2.2 mW/cm$^2$, providing approximately 250 mJ/cm$^2$ irradiation energy, sufficient to cure the coating into a pressure sensitive adhesive. Samples of the adhesive on the release liner were then adhered to either a glass plate (Peel determination) or a steel plate (Shear determination), as described above, for adhesive evaluation.

Properties of the cured adhesives are shown in Table 5.

TABLE 5

| Sample | HEA, g | VDM, g | Thickness, mm | 180° Peel, N/dm | Shear, 23° C., min | Shear, 100° C., min | Probe Tack, g |
|---|---|---|---|---|---|---|---|
| 11 | 0.2 | 0.24 | 0.078 | 74 | 9048 | 30[1] | 1126 |
| 12 | 1 | 1.19 | 0.075 | 70 | >10000 | >10000 | 1218 |
| 13 | 2.0 | 2.4 | 0.060 | 62 | >10000 | >10000 | 801 |

[1]Adhesive transfer to plate and backing

The data of Table 5 show that preparing a syrup including HEA, then curing the syrup in the presence of VDM, provided a high-shear, high-peel adhesive having excellent tack.

Example 6

The procedure described in Example 5 was repeated, except that smaller amounts of VDM and HEA were added (shown in Table 6), and 0.08 g of hexanediol diacrylate (HDDA) was added to each syrup along with the VDM. Properties of the cured adhesives are shown in Table 6. For each sample, shear times for a 1 Kg weight at 70° C. were greater than 10,000 minutes.

TABLE 6

| Sample | HEA, g | VDM, g | Thickness, mm | 180° Peel, N/dm | Gel % |
|---|---|---|---|---|---|
| 14 | 0.02 | 0.024 | 0.068 | 77 | 94 |
| 15 | 0.05 | 0.06 | 0.070 | 75 | 96 |
| 16 | 0.1 | 0.12 | 0.068 | 68 | 96 |

The data of Table 6 show that acceptable adhesive performance was obtained using formulations containing small amounts of VDM, HEA and a multifunctional acrylate crosslinker, HDDA.

Example 7

Sample 13 of Example 5 was further treated as follows: After the final UV cure, the adhesive was heated at 100° C. for the times indicated in Table 7, then applied to the glass plate. Peel strengths and percent gel were determined for each sample.

TABLE 7

| Sample | Time, min | 180° Peel, N/dm | % Gel |
|---|---|---|---|
| 13 | 0 | 62 | — |
| 17 | 10 | 42 | 99 |
| 18 | 30 | 34 | 98 |
| 19 | 60 | 35 | 97 |
| 20 | 120 | 26 | 99 |

The data of Table 3 show that further curing occurred on prolonged heating of the adhesive.

Example 8

A mixture comprising 100.04 g of the stock solution was partially photopolymerized in bulk in a nitrogen atmosphere by UV irradiation using 40-watt fluorescent bulbs such that the resulting syrup had a Brookfield viscosity of approximately 1500 cps. In this Example, neither VDM nor HEA were added before the coatable syrup was prepared.

To the syrup was added, with thorough mixing, portions of 2-vinyl-4,4-dimethyl-2-oxazoline-5-one (vinyldimethylazlactone (VDM) ranging from 0.24 to 2.4 g, portions of hydroxyethyl acrylate (HEA) ranging from 0.2 to 2 g, and 0.16 g KB-1™ photoinitiator. The syrup mixtures were knife coated onto 40 μm thick poly(ethylene terephthalate) release liner film at a coating thickness as shown in Table 8. The coating was exposed to UV irradiation at approximately 300–400 nm wavelength at 2.2 mW/cm², providing approximately 250 mJ/cm² irradiation energy, sufficient to cure the coating into a pressure sensitive adhesive. Samples of the adhesive on the release liner were then adhered to either a glass plate (Peel determination) or a steel plate (Shear determination), as described above, for adhesive evaluation.

Properties of the cured adhesives are shown in Table 8.

TABLE 8

| Sample | HEA, g | VDM, g | Thickness, mm | 180° Peel, N/dm | Shear, 23° C., min | Shear, 100° C., min | Probe Tack, g |
|---|---|---|---|---|---|---|---|
| 21 | 0.2 | 0.24 | 0.078 | 86 | >10000 | 43[1] | 788 |
| 22 | 1 | 1.19 | 0.075 | 81 | >10000 | >10000 | 480 |
| 23 | 2.0 | 2.4 | 0.060 | 75 | >10000 | >10000 | 543 |

[1]Adhesive transfer to plate and backing

The data of Table 8 show that adding HEA and VDM monomers to a syrup, then curing the syrup, provides a high-shear, high-peel adhesive having adequate tack to perform as a PSA.

Example 9

The procedure described in Example 8 was repeated, except that smaller amounts of VDM and HEA were added (shown in Table 9), and 0.08 g of hexanediol diacrylate (HDDA) was added to each syrup along with the two added monomers. Properties of the cured adhesives are shown in Table 9. For each sample, shear times for a 1 Kg weight at 70° C. were greater than 10,000 minutes.

TABLE 9

| Sample | HEA, g | VDM, g | Thickness, mm | 180° Peel, N/dm | Gel % |
|---|---|---|---|---|---|
| 24 | 0.02 | 0.024 | 0.068 | 50 | 97 |
| 25 | 0.05 | 0.06 | 0.070 | 50 | 96 |
| 26 | 0.1 | 0.12 | 0.068 | 61 | 96 |

The data of Table 9 show that acceptable adhesive performance can be obtained using formulations containing small amounts of VDM, HEA and a multifunctional acrylate crosslinker, HDDA.

Example 10

Sample 23 of Example 8 was further treated as follows: After the final UV cure, the adhesive was heated at 100° C. for the times indicated in Table 10, then applied to the glass plate. Peel strengths and percent gel were determined for each sample.

TABLE 10

| Sample | Time, min | 180° Peel, N/dm | % Gel |
|---|---|---|---|
| 23 | 0 | 75 | — |
| 27 | 10 | 47 | 99 |
| 28 | 30 | 41 | 98 |
| 29 | 60 | 36 | 98 |
| 30 | 120 | 33 | 98 |

The data of Table 10 show that further curing occurred on prolonged heating of the adhesive.

Example 11

To 100.04 g of the stock solution was added, with thorough mixing, portions of 2-hydroxyethyl acrylate (HEA) ranging from 0.2 to 2.0 g and portions of 2-vinyl-4,4-dimethyl-2-oxazoline-5-one (vinyldimethylazlactone (VDM)) ranging from 0.24 to 2.4 g as shown in Table 11. Each mixture was partially photopolymerized in bulk in a nitrogen atmosphere by UV irradiation using 40-watt fluorescent bulbs such that the resulting syrup had a Brookfield viscosity of approximately 1500 cps.

The syrup mixtures were knife coated onto 40 μm thick poly(ethylene terephthalate) release liner film at a coating thickness as shown in Table 5. The coating was exposed to UV irradiation at approximately 300–400 nm wavelength at 2.2 mW/cm² providing approximately 250 mJ/cm² irradiation energy, sufficient to cure the coating into a pressure sensitive adhesive. Samples of the adhesive on the release liner were then adhered to either a glass plate (Peel determination) or a steel plate (Shear determination), as described above, for adhesive evaluation.

Properties of the cured adhesives are shown in Table 11.

TABLE 11

| Sample | HEA, g | VDM, g | Thickness, mm | 180° Peel, N/dm | Shear, 23° C., min | Shear, 100° C., min | Probe Tack, g |
|---|---|---|---|---|---|---|---|
| 31 | 0.2 | 0.24 | 0.053 | 72 | >10000 | >10000 | 999 |
| 32 | 1 | 1.19 | 0.065 | 84 | >10000 | >10000 | 1121 |
| 33 | 2.0 | 2.4 | 0.068 | 78 | >10000 | >10000 | 781 |

The data of Table 11 show that preparing a syrup including HEA and VDM, then curing the syrup, provided a high-shear, high-peel adhesive having adequate tack to perform as a PSA.

Example 12

The procedure described in Example 11 was repeated, except that smaller amounts of VDM and HEA were added (shown in Table 12), and 0.08 g of hexanediol diacrylate (HDDA) was added to each syrup. Properties of the cured adhesives are shown in Table 12. For each sample, shear times for a 1 Kg weight at 70° C. were greater than 10,000 minutes.

TABLE 12

| Sample | HEA, g | VDM, g | Thickness, mm | 180° Peel, N/dm | Gel % |
|---|---|---|---|---|---|
| 34 | 0.02 | 0.024 | 0.063 | 65 | 96 |
| 35 | 0.05 | 0.06 | 0.060 | 63 | 100 |
| 36 | 0.1 | 0.12 | 0.065 | 57 | 98 |

The data of Table 12 show that acceptable adhesive performance was obtained using formulations containing small amounts of VDM, HEA and a multifunctional acrylate crosslinker, HDDA.

Example 13

Sample 33 of Example 11 was further treated as follows: After the final UV cure, the adhesive was heated at 100° C. for the times indicated in Table 13, then applied to the glass plate. Peel strengths and percent gel were determined for each sample.

TABLE 13

| Sample | Time, min | 180° Peel, N/dm | % Gel |
|---|---|---|---|
| 33 | 0 | 78 | — |
| 37 | 10 | 41 | 100 |
| 38 | 30 | 40 | 98 |
| 39 | 60 | 32 | 98 |
| 40 | 120 | 28 | 99 |

The data of Table 13 show that further curing occurred on prolonged heating of the adhesive.

Example 14

Polymer I: Terpolymer Containing Hydroxyl Pendant Units

In a glass polymerization bottle were charged 80 g isooctyl acrylate (IOA), 18 g isobornyl acrylate (IBA), 2 g 2-hydroxyethyl acrylate (HEA), 100 g ethyl acetate, 0.5 g benzoyl peroxide and 0.04 g carbon tetrabromide. The bottle was purged with nitrogen, sealed and tumbled in a water bath maintained at 60° C. for 12 hours to produce an IOA/IBA/HEA terpolymer. The polymer was isolated by precipitation in methanol and dried under vacuum.

Polymer II: Terpolymer Containing Azlactone Pendant Units

In a glass polymerization bottle were charged 80 g isooctyl acrylate (IOA), 18 g isobornyl acrylate (IBA), 2 g vinyldimethylazlactone (VDM), 100 g ethyl acetate, 0.5 g benzoyl peroxide and 0.04 g carbon tetrabromide. The bottle was purged with nitrogen, sealed and tumbled in a water bath maintained at 60° C. for 12 hours to produce a IOA/IBA/VDM terpolymer. The polymer was isolated by precipitation in isopropanol and dried under vacuum.

Pressure Sensitive Adhesives

Three coatable compositions were prepared by dissolving varying amounts of Polymer I and Polymer II in 80 parts by weight of a mixture comprising 80 parts by weight of IOA, 20 parts by weight of IBA, 0.2 parts by weight of 2,2-dimethoxy-2-phenylacetophenone photoinitiator (Irgacure™ 651, Ciba Specialty Chemicals, Tarrytown, N.Y.), and 0.1 parts by weight of hexanedioldiacrylate (HDDA), as described in Table 14. Each mixture was knife coated at a thickness of 50 μm onto 50 μm-thick PET backing. In a nitrogen-rich chamber (i.e., about 250 ppm oxygen), the coated samples were exposed to UV radiation for 48 seconds at an intensity of 2.0 mW/cm² followed by 97 seconds exposure at an intensity of 2.2 mW/cm² (as measured by a UVIMAP™ radiometer, EIT Inc., Sterling, Va.)

Each sample was evaluated for peel strength and shear strength. Results are compiled in Table 14.

TABLE 14

| Sample | Polymer I, pbw | Polymer II, pbw | Peel, N/dm | Shear, min, 70° C. |
|---|---|---|---|---|
| 41 Comparative | 0 | 0 | 70 | 750 |
| 42 | 5 | 15 | 72 | >10000 |
| 43 | 10 | 10 | 69 | >10000 |
| 44 | 15 | 5 | 71 | >10000 |

The data of Table 14 show that coatable compositions comprising polymer I and polymer II having mutually crosslinkable groups was cured to provide PSAs having shear values of at least 10000 minutes at 70° C. In comparison, an adhesive prepared in the absence of crosslinkable groups exhibited lower shear strengths.

Example 15

Polyol Preparation

In a reaction flask equipped with a mechanical stirrer and N₂ atmosphere was charged 25 g of a 3-generation polyester polyol (Mw=3500, OH=32/molecule, from Perstorp Polyols, Inc., Toledo, Ohio). The flask was heated at 130–140° C. for 45 minutes, during which the solid polyol melted. With continuous stirring, 27.97 g octanoic acid was added. Heating and stirring were continued for 3 hours, during which a few drops of toluene were added each 30 minutes in order to collect any H₂O produced by azeotropic distillation. The N₂ gas was turned off and the reaction flask was sealed and connected to a vacuum pump for 1 hour. In the resulting polyester polyol approximately 85% of the hydroxyl groups were converted to octanoyl esters.

Pressure Sensitive Adhesive

A series of pressure sensitive adhesive tapes were made by first partially polymerizing a mixture of, by weight, containing 80 parts by weight of isooctyl acrylate, 18 parts by weight isobornyl acrylate, 2 parts by weight vinyldimethylazlactone (VDM), and 0.04 parts by weight of Irgacure™ 651 photoinitiator. Partial photopolymerization was accomplished in an inert atmosphere using a bank of 40-watt fluorescent black lights to provide a coatable syrup of a viscosity of about 1500 cps, as described in Example 1. The modified generation-3 dendrimer was added to each syrup, along with an optional addition of HDDA, and thoroughly mixed, in proportions described in Table 15. Each mixture was coated using a conventional knife coater onto biaxially-oriented PET film. The coated film was passed through an inert chamber and irradiated with the same fluorescent lamps to provide pressure sensitive adhesives. The results are summarized in Table 15.

TABLE 15

| Sample | Syrup, pbw | Polyol, pbw | HDDA, pbw | Peel Adhesion, N/dm | Shear, min, 23° C. | Shear, min, 70° C. |
|---|---|---|---|---|---|---|
| 45 Comparative | 100 | — | 0.1 | 74 | 10000 | 750 |
| 46 | 98 | 2 | — | 68 | >10000 | 890 |
| 47 | 98 | 2 | 0.1 | 72 | >10000 | >10000 |
| 48 | 95 | 5 | — | 64 | >10000 | 5600 |
| 49 | 95 | 5 | 0.1 | 67 | >10000 | >10000 |

The data of Table 15 show that a high-strength PSA was prepared using a functional polymer to effect crosslinking in place of a functional monomer, especially when used in conjunction with a multifunctional acrylate crosslinker, HDDA.

What is claimed is:

1. A syrup polymer composition comprising
    a) a first component solute polymer comprising a plurality of polymerized monomer units comprising pendant reactive nucleophilic or electrophilic functional groups;
    b) a second component dendritic polymer co-reactive with said first component solute polymer; and
    c) a third component comprising at least one free-radically polymerizable solvent monomer.

2. The composition of claim 1 which comprises:
    (a) from 2 to 20 parts by weight of said first component solute polymer;
    (b) from 0.01 to 10.00 parts by weight of said second component dendritic polymer;
    (c) from 70.00–97.99 parts by weight of said third component solvent monomer.

3. The composition of claim 1 having a viscosity of 500 to 10,000 cPs at 22° C.

4. The composition of claim 1 wherein said first solute polymer comprises
    (a) from 75.00 to 99.99 parts by weight of polymerized monomer units derived from acrylic acid esters of non-tertiary alkyl alcohols containing 1–14 carbon atoms;
    (b) from 0.01 to 5.00 parts by weight of polymerized monomer units derived from of an ethylenically-unsaturated monomer having a reactive nucleophilic or electrophilic functional group;
    (c) from 0 to 10 parts by weight of at least one polar monomer; and
    (d) from 0 to 10 parts by weight of at least one other monomer.

5. The syrup polymer composition of claim 4 wherein said polar monomer, when present, is selected from the group consisting of substituted (meth)acrylamides, N-vinyl pyrrolidone, N-vinyl caprolactam, acrylonitrile, tetrahydrofurfuryl acrylate, acrylamides, and mixtures thereof.

6. The syrup polymer of claim 1 wherein said second component comprises a dendritic polymer having co-reactive functional groups and a functionality of greater than 3.

7. The composition of claim 6 wherein said dendritic polymer the general formula R-(Z)$_n$ where Z is a functional group, n is greater than 3 and R is an organic radical having a valency of n.

8. The composition of claim 7 wherein said dendritic polymer is selected from the group consisting of a dendrimer, regular dendron, dendrigraft or hyperbranched polymer.

9. The composition of claim 1 wherein said third component solvent monomer comprises polymerizable, ethylenically-unsaturated monomers selected from acrylic acid esters of non-tertiary alkyl alcohols containing 1–14 carbon atoms.

10. The composition of claim 4, wherein said nucleophilic functional group of said ethylenically-unsaturated monomer possessing a nucleophilic functional group is selected from hydroxy, amino, isocyanato and azlactone functional groups.

11. A process for making a substrate bearing a coating of a crosslinkable pressure-sensitive adhesive on at least one surface thereof, comprising the steps of:
    a) coating onto said substrate the syrup polymer composition of claim 1, and
    b) subjecting said coated mixture to sufficient energy to activate said initiator and to polymerize said solvent monomer(s).

12. The process of claim 11 wherein said polymerization of said solvent monomers generates sufficient heat to crosslink said first solute polymer and second component by forming covalent bonds between said reactive groups of said first solute polymer and co-reactive groups of said second component.

13. The process of claim 11 wherein said syrup polymer composition has been partially polymerized to a coatable viscosity of from 750 to 7,500 cPs at 22° C. prior to step a).

14. The process of claim 11 whereon said syrup polymer composition comprises:
    (a) from 2 to 20 parts by weight of said first component solute polymer;
    (b) from 0.01 to 10.00 parts by weight of said second component dendritic polymer;
    (c) from 70.00 to 97.99 parts by weight of said third component solvent monomer, and
    (d) from 0.0001 to about 3.0 parts by weight of a free-radical initiator.

15. The process of claim 11 wherein said first component solute polymer comprises:
    (a) from 75.00 to 99.99 parts by weight of polymerized monomer units derived from acrylic acid esters of non-tertiary alkyl alcohols containing 1–14 carbon atoms;
    (b) from 0.01 to 5.00 parts by weight of polymerized monomer units derived from of an ethylenically-unsaturated monomer having a reactive nucleophilic or electrophilic functional group;
    (e) from 0 to 10 parts by weight of at least one polar monomer; and
    (f) from 0 to 10 parts by weight of at least one other monomer.

16. The process of claim 15 wherein said polar monomer, when present, is selected from the group consisting of substituted (meth)acrylamides, N-vinyl pyrrolidone, N-vinyl caprolactam, acrylonitrile, tetrahydrofurfuryl acrylate, acrylamides, and mixtures thereof.

17. The process of claim 11 wherein said polyfunctional compound the general formula R-(Z)$_n$ where Z is a functional group, n is greater than 3 and R is an organic radical having a valency of n.

18. The process of claim 11 wherein said wherein said dendritic polymer is selected from the group consisting of a dendrimer, regular dendron, dendrigraft or a hyperbranched polymer.

19. The process of claim 11 wherein said third component solvent monomer comprises polymerizable, ethylenically-unsaturated monomers selected from acrylic acid esters of non-tertiary alkyl alcohols containing 1–14 carbon atoms.

20. The process of claim 15 wherein said nucleophilic functional group of said ethylenically-unsaturated monomer possessing a nucleophilic functional group is selected from hydroxy, amino, isocyanato and azlactone functional groups.

* * * * *

UNITED STATES PATENT AND TRADEMARK OFFICE
CERTIFICATE OF CORRECTION

PATENT NO. : 6,677,402 B2
DATED : January 13, 2004
INVENTOR(S) : Gaddam, Babu

It is certified that error appears in the above-identified patent and that said Letters Patent is hereby corrected as shown below:

Column 4,
Line 7, delete "isobomyl" and insert -- isobornyl --.

Column 8,
Line 43, in equation 1, delete "$W_1$" and insert -- $W_i$ --.

Column 13,
Line 22, delete "mW/cm" and insert -- $mW/cm_2$ --.
Lines 22-29, delete "Accordingly, relatively...polymer composition.".
Line 23, insert -- Accordingly, relatively...polymer composition. --.

Column 21,
Line 50, delete "isobomyl" and insert -- isobornyl --.

Column 24,
Line 56, delete "(e)" and insert -- (c) --.
Line 58, delete "(f)" and insert -- (d) --.

Signed and Sealed this

Seventeenth Day of January, 2006

JON W. DUDAS
*Director of the United States Patent and Trademark Office*